(12) United States Patent
Varadharajan et al.

(10) Patent No.: US 12,430,102 B2
(45) Date of Patent: Sep. 30, 2025

(54) AUTOMATICALLY MODIFYING USER CODE USING ARTIFICIAL INTELLIGENCE TECHNIQUES

(71) Applicant: Dell Products L.P., Round Rock, TX (US)

(72) Inventors: Srinivas Varadharajan, Austin, TX (US); Rakshith Vasudev, Austin, TX (US); Yunfan Han, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 228 days.

(21) Appl. No.: 18/123,450

(22) Filed: Mar. 20, 2023

(65) Prior Publication Data
US 2024/0319966 A1   Sep. 26, 2024

(51) Int. Cl.
*G06F 8/30* (2018.01)
*G06N 5/04* (2023.01)

(52) U.S. Cl.
CPC  *G06F 8/30* (2013.01); *G06N 5/04* (2013.01)

(58) Field of Classification Search
CPC . G06F 8/30; G06N 5/04; G06N 3/044; G06N 3/045; G06N 3/08
See application file for complete search history.

(56) References Cited

U.S. PATENT DOCUMENTS

| | | | |
|---|---|---|---|
| 9,946,517 B2 | 4/2018 | Talby et al. | |
| 10,474,559 B2 | 11/2019 | Moorthi et al. | |
| 11,238,223 B2 * | 2/2022 | Nuolf | G06F 8/33 |
| 11,442,702 B2 | 9/2022 | Smith et al. | |
| 11,599,356 B1 * | 3/2023 | Kimball | G06F 11/3055 |
| 11,809,841 B1 * | 11/2023 | Zhang | G06F 8/33 |
| 12,118,350 B1 * | 10/2024 | Mukherjee | G06F 8/71 |
| 2016/0224453 A1 * | 8/2016 | Wang | G06F 11/3604 |
| 2018/0039566 A1 * | 2/2018 | Luenstroth | G06F 8/4441 |
| 2019/0079734 A1 * | 3/2019 | Kadam | G06F 21/577 |
| 2020/0019493 A1 * | 1/2020 | Ramakrishna | G06F 11/3688 |
| 2021/0132915 A1 * | 5/2021 | Ivankovic | G06N 5/04 |
| 2021/0182039 A1 * | 6/2021 | Cappello | G06N 20/00 |
| 2021/0192321 A1 * | 6/2021 | Zhang | G06F 8/427 |
| 2021/0374561 A1 * | 12/2021 | Krishnamoorthy | G06N 5/04 |
| 2022/0050769 A1 * | 2/2022 | Huang | G06F 11/3644 |
| 2022/0244937 A1 * | 8/2022 | Prasad | G06N 5/022 |
| 2024/0184691 A1 * | 6/2024 | Murchison | G06F 11/368 |

* cited by examiner

*Primary Examiner* — Marina Lee
(74) *Attorney, Agent, or Firm* — Ryan, Mason & Lewis, LLP

(57) ABSTRACT

Methods, apparatus, and processor-readable storage media for automatically modifying user code using artificial intelligence techniques are provided herein. An example computer-implemented method includes obtaining user-provided code and one or more items of information associated with the user-provided code; determining code functionality information and one or more execution-related details associated with the user-provided code by processing at least a portion of the user-provided code and at least a portion of the items of information using artificial intelligence techniques; generating one or more code segments, related to one or more portions of the user-provided code, by processing the code functionality information and the execution-related detail(s) using the artificial intelligence techniques; executing at least a portion of the code segment(s) in at least one simulation environment; and performing one or more automated actions based on results from executing the at least a portion of the code segment(s).

20 Claims, 8 Drawing Sheets

| AUTONOMY LEVEL | EXAMPLES |
|---|---|
| LEVEL 1 | ACCELERATOR SELECTION, BASIC ENVIRONMENT VARIABLE SETUP, etc. |
| LEVEL 2 | EFFICIENT DATA PIPELINES |
| LEVEL 3 | SOFTWARE STACK OPTIMIZATIONS |
| LEVEL 4 | SYSTEM, MODEL ARCHITECTURE AND ACCELERATOR-SPECIFIC OPTIMIZATION |
| LEVEL 5 | ALL LAYERS IN TRAINING PIPELINE OPTIMIZED |

AUTOMATICALLY MODIFYING USER CODE USING ARTIFICIAL INTELLIGENCE TECHNIQUES

FIELD

The field relates generally to information processing systems, and more particularly to techniques for implementing code in such systems.

BACKGROUND

Commonly, using conventional approaches, data scientists, software engineers, infrastructure administrators and/or domain experts face challenges in collaborating to identify hardware resources necessary for implementing code in environments such as data centers. Such challenges include bottlenecks and limits in performance tuning capabilities, often resulting in errors and/or low-quality, resource-intensive code deployments.

SUMMARY

Illustrative embodiments of the disclosure provide techniques for automatically modifying user code using artificial intelligence techniques.

An exemplary computer-implemented method includes obtaining user-provided code and one or more items of information associated with the user-provided code, and determining code functionality information associated with the user-provided code and one or more execution-related details associated with the user-provided code by processing at least a portion of the user-provided code and at least a portion of the one or more items of information using one or more artificial intelligence techniques. The method also includes generating one or more code segments, related to one or more portions of the user-provided code, by processing the code functionality information and the one or more execution-related details using the one or more artificial intelligence techniques. Additionally, the method includes executing at least a portion of the one or more code segments in at least one simulation environment, and performing one or more automated actions based at least in part on results from executing the at least a portion of the one or more code segments in the at least one simulation environment.

Illustrative embodiments can provide significant advantages relative to conventional approaches. For example, problems associated with errors and/or low-quality, resource-intensive code deployments are overcome in one or more embodiments through automatically modifying user code using artificial intelligence techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
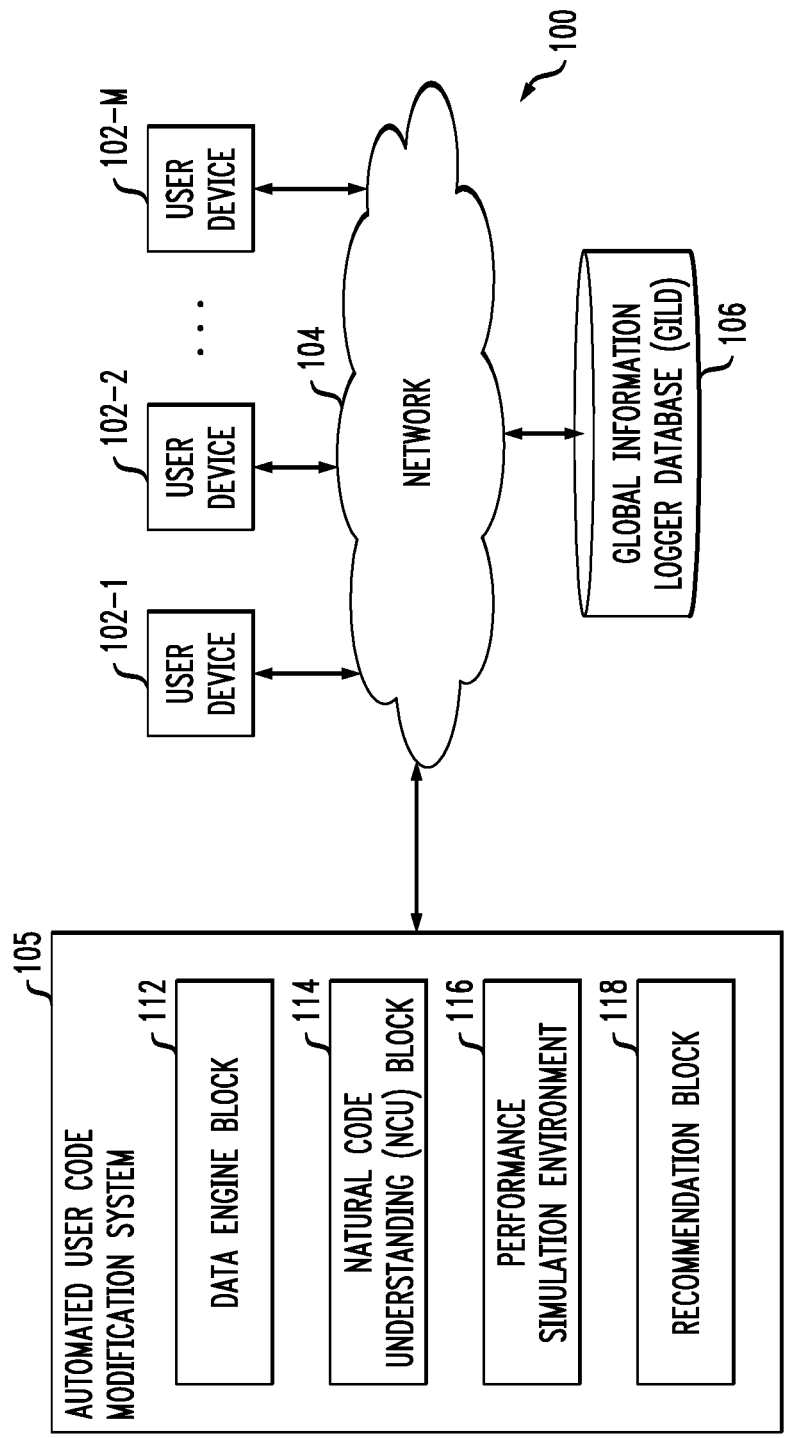
FIG. 1 shows an information processing system configured for automatically modifying user code using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated user code modification system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated user code modification system 105 can have an associated global information logger database (GILD) 106 configured to store data pertaining to various code implementations, which comprise, for example, code execution environment information, performance-related data, task-related data, etc.

The GILD 106 in the present embodiment is implemented using one or more storage systems associated with automated user code modification system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated user code modification system 105 are one or more input-output devices, which illustratively comprise keyboards, displays or other types of input-output devices in any combination. Such input-output devices can be used, for example, to support one or more user interfaces to automated user code modification system 105, as well as to support communication between automated user code modification system 105 and other related systems and devices not explicitly shown.

Additionally, automated user code modification system 105 in the FIG. 1 embodiment is assumed to be implemented using at least one processing device. Each such processing device generally comprises at least one processor and an associated memory, and implements one or more functional modules for controlling certain features of automated user code modification system 105.

More particularly, automated user code modification system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated user code modification system 105 to communicate over the network 104 with the user devices 102, and illustratively comprises one or more conventional transceivers.

The automated user code modification system 105 further comprises data engine block 112, NCU block 114, performance simulation environment 116 and recommendation block 118.

It is to be appreciated that this particular arrangement of elements 112, 114, 116 and 118 illustrated in the automated user code modification system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automatically modifying user code using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated user code modification system 105 and GILD 106 can be on and/or part of the same processing platform.

An exemplary process utilizing elements 112, 114, 116 and 118 of an example automated user code modification system 105 in computer network 100 will be described in more detail with reference to the flow diagram of FIG. 8.

Accordingly, at least one embodiment includes generating and/or implementing at least one autonomous performant data scientist for artificial intelligence techniques training in data centers. Such an embodiment can include automatically identifying underlying hardware topology, one or more software libraries, one or more deep learning models, one or more optimizers, one or more machine learning frameworks, etc., and providing one or more local hardware and/or software optimization opportunities based at least in part thereon. Additionally, at least one embodiment can also include determining and/or outputting one or more related recommendations, considering, for example, best practices and/or one or more optimized techniques to render improved utilization of one or more systems under operation. Further, such as embodiment can include using the recommendation(s) to implement at least one optimized automated code block which can be plugged into and/or replace a user's original code.

As detailed herein, one or more embodiments include implementing at least one software tool for optimizing utilization for artificial intelligence-related workloads at at least one datacenter and improving the quality of service (QOS) related thereto. Such an embodiment includes processing and/or understanding the workloads to optimize at least a portion of the workloads on a systems level, as well as processing and/or understanding model architecture, deep learning framework operations, other local hardware level optimizations, etc.

One or more embodiments include interacting with different layers of a stack to extract performance (e.g., the most performance) out of a given data center with respect to artificial intelligence workloads. Such an embodiment includes processing inputs including the user's workload(s), understanding the objective(s) related thereto, generating at least one optimized version of the workload(s), and recommending to the user one or more different optimizations (e.g., the top five recommended optimizations) along with corresponding QoS results. To provide quality recommendations for the user, at least one embodiment can include using autonomy levels, user-added tags, and/or data pertaining to previous user interactions with at least a portion of the recommendations.

As also described herein, one or more embodiments include generating and/or implementing a user interface-based tool to provide different recommendations to users such as, for example, data scientists. Such recommendations can be based, e.g., at least in part on QoS metrics, workload run time data (e.g., throughput), user history, previous user interactions and/or user activities, user requirements (e.g., hardware requirements, software requirements, and/or model architecture requirements), etc. Additionally, at least one embodiment includes facilitating modification of user code to produce optimized code and/or automatically generating an optimized version of the user code. Further, one or more embodiments include integrating with one or more existing environments, and well as implementing at least one GILD for machine learning experiment data collection.

Figures 2, 3:
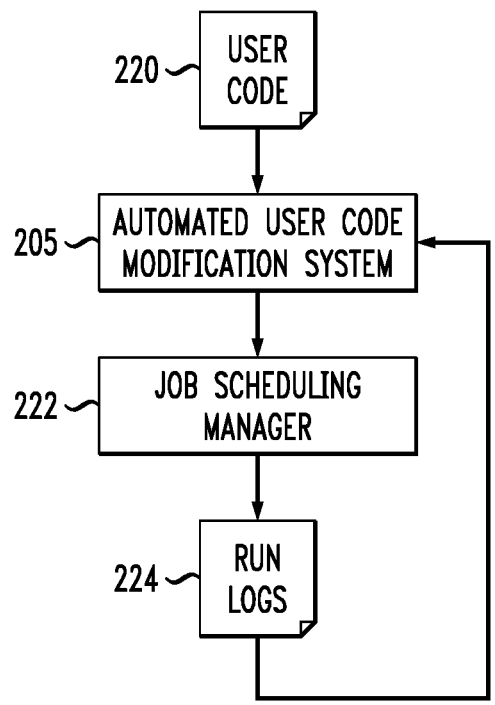
FIG. 2 shows an example workflow in accordance with an illustrative embodiment.
FIG. 3 shows a table of example autonomy levels in an illustrative embodiment.

FIG. 2 shows an example workflow in accordance with an illustrative embodiment. By way of illustration, FIG. 2 depicts an example workflow within a lifecycle of a training job. Specifically, a user submits user code 220, and automated user code modification system 205 processes at least a portion of the user code 220, optimizes for one or more quality of service metrics (e.g., accuracy) and/or throughput, and outputs multiple optimized recommendations while allowing the user to select therefrom in connection with job scheduling manager 222. The user selection is launched to run in step 224, and once run, logs and other data related to the submission are fed back into automated user code modification system 205.

The user (e.g., data scientist, system administrator, etc.) can process information related to the optimized recommendations with respect to one or more trade-offs and/or objectives. Also, in one or more embodiments, results associated with recommendations can be measured relative to baseline values from the user's original code, and the initial settlement of such measures can be derived from at least one simulation engine.

As also detailed herein, at least one embodiment includes the use of multiple levels of autonomy, which enable users to select one or more expectations. Depending on the expertise level of the user (e.g., data scientist), each user can have a different preference with respect to autonomy level.

FIG. 3 shows a table 300 of example autonomy levels in an illustrative embodiment. As illustrated in FIG. 3, in one or more embodiments, level 1 autonomy could provide simple recommendations (e.g., accelerator selection, basic environment variable setup, etc.), while level 5 autonomy could provide more complex recommendations (e.g., optimizing all layers in training pipeline, including hardware and software). Also, level 2 through level 5 can each build upon the previous level(s). For example, level 3 may not only improve software stack optimizations but can also improve upon the efficient data pipelines associated with level 2 and basic environment variables setup associated with level 1. In one or more embodiments, higher level changes can be carried out initially, and lower level changes can be implemented to improve at least a portion of the higher level changes.

Figure 4:
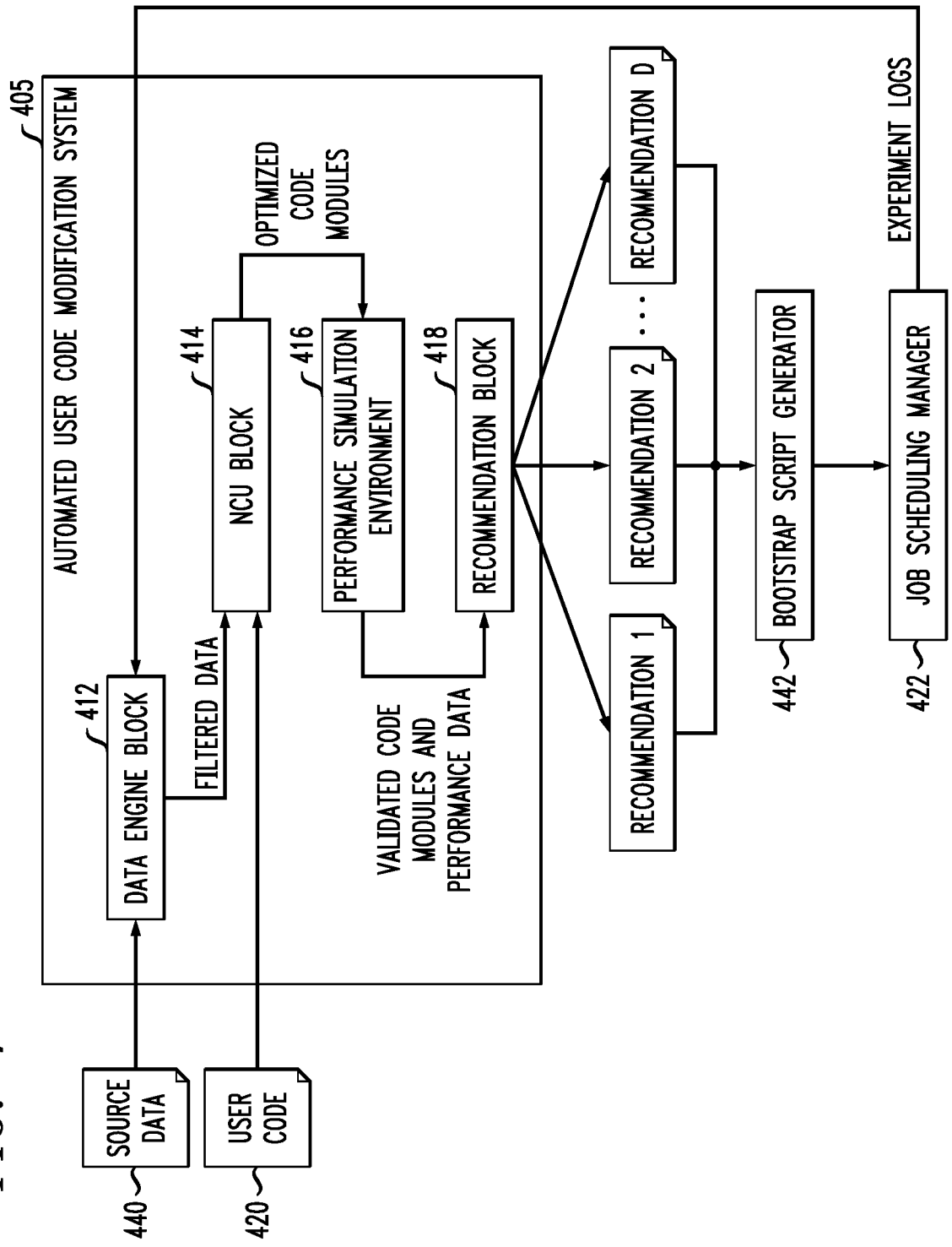
FIG. 4 shows example architecture of an illustrative embodiment.

FIG. 4 shows example architecture of an illustrative embodiment. By way of illustration, FIG. 4 depicts automated user code modification system 405, which includes data engine block 412, NCU block 414, performance simulation environment 416, recommendation block 418, and bootstrap script generator 442. FIG. 4 also depicts source data 440, user code 420, and job scheduling manager 422. More specifically, as illustrated in FIG. 4, source data 440 is provided to data engine block 412, which processes the source data 440 and outputs filtered data (as further detailed in connection with FIG. 5) to NCU block 414. As also depicted in FIG. 4, user code 420 is provided to NCU block 414, which processes the user code 420 in conjunction with the filtered data output by data engine block 412 and outputs optimized code modules (as further detailed in connection with FIG. 6) to performance simulation environment 416. Performance simulation environment 416 subsequently outputs validated code modules and performance data to recommendation block 418. In one or more embodiments an approximation is made for the time for a given workload to run and the accuracy of the workload, wherein such an approximation facilitates obtaining and/or determining performance simulation environment details if the given workload is not already documented in the GILD. If the given workload is already documented in the GILD, workload parameters can be estimated from the GILD.

Additionally, as also depicted in FIG. 4, recommendation block 418 processes the validated code modules and performance data and generates and outputs multiple recommendations (as further detailed in connection with FIG. 7) to bootstrap script generator 442. Bootstrap script generator 442 generates and outputs, to job scheduling manager 422, one or more scripts related to at least a portion of the recommendations. Job scheduling manager 422 can then run the scripts and provide experiment log data back to data engine block 412.

Figure 5:
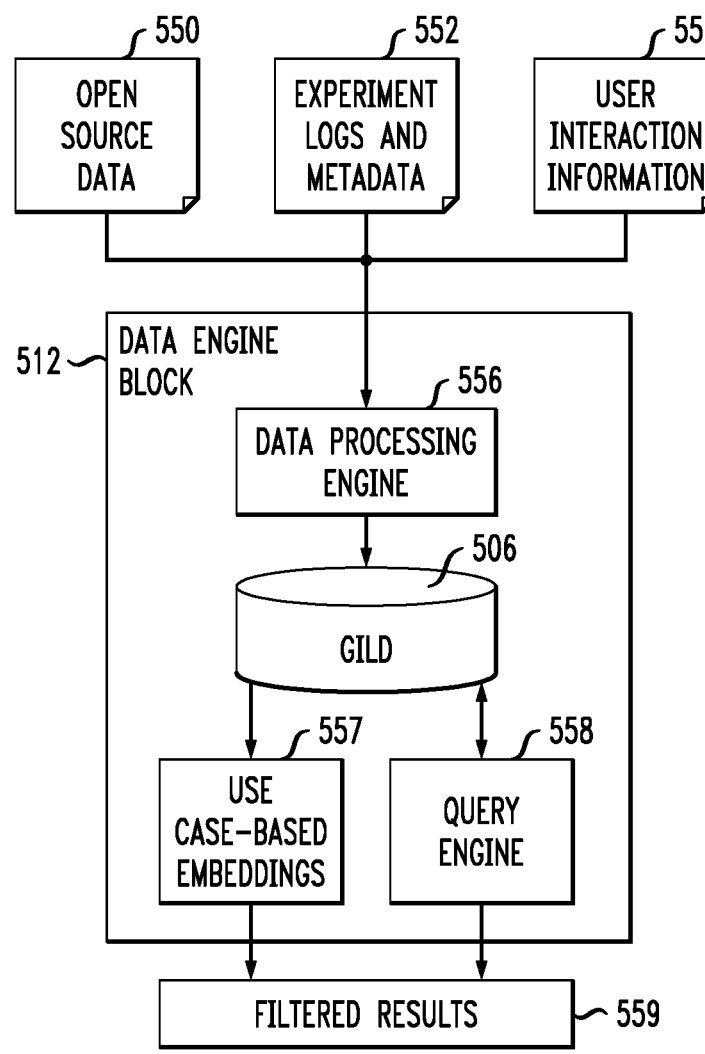
FIG. 5 shows example architecture of a data engine block in an illustrative embodiment.

FIG. 5 shows example architecture of a data engine block in an illustrative embodiment. By way of illustration, FIG. 5 depicts data engine block 512, which includes data processing engine 556, GILD 506, and query engine 558. More specifically, as depicted in FIG. 5, data are extracted from different sources including, for example, open source and/or publicly-available data 550 (e.g., GitHub data which provides data for initial model training, tool documentation for performance enhancement, performance blogs, technical papers from various hardware vendors, etc.), experiment logs and corresponding metadata 552 (e.g., experiments run for machine learning tasks with various experiment details such as compute used, software environment details, workload model architecture, dataset, preprocessing approaches, evaluation metrics, power consumption, workload runtime details, hyperparameters used in the model, workload profiling information, etc.), and user interaction information 554 (e.g., data scientists accepting, approving, or rejecting recommendations, if the user was satisfied with the recommendation(s), usage of different levels of autonomy and labelled tags from user input, etc.).

Additionally, data processing engine 556 transforms at least a portion of the data from sources 550, 552 and 554 to at least one format required for machine learning (for example, technical blogs and research papers are converted into a context such as model architecture details, performance numbers, recommended environment variables, data, model, pipeline parallelization techniques, etc.). In one or more embodiments, data processing engine 556 includes one or more transformer based encoder-decoder language models which are used to extract information (e.g., named entities) from one or more of the data sources.

Data converted by data processing engine 556 are provided to and/or stored in GILD 506. In at least one embodiment, data contained in GILD 506 can be used as training data for one or more artificial intelligence techniques. Such data can include, for example, experiment information for workload tasks such as object detection, question answering, classification, image segmentation, speech recognition, reinforcement learning, etc., as well as control settings and corresponding performance data. By way of example, such experiments can be initially created, run, and labelled by experts, and subsequent workload submissions can be automated to generate labels and logging information automatically. Additionally, as further detailed below in connection with FIG. 6, a machine learning optimization engine can learn from such data and make recommendations to the user regarding various changes related, for example, to model architecture, code, environment variables, hardware optimization, etc.

Also, GILD 506 can include various preprocessed structured and unstructured data. GILD 506 can serve as a source for creating use case-based embeddings 557, understanding the performance of various modules, as well as for query engine 558, which generates queries (e.g., custom queries) including, e.g., queries related to autonomy level mapping, performance details and labels for machine learning models.

As noted above and depicted in FIG. 5, use case-based embeddings 557 can be implemented to facilitate operations for a recommendation engine (e.g., by noting how a product recommendation works by creating user-based and/or product-based embeddings). Creating use case based embeddings can include identifying various code modules and corresponding functionality for each use case (e.g., popular machine learning tasks). Also, creating use case based embeddings can provide a way to map similarly themed modules (e.g., modules related to data pipelines, modules related to hyperparameter tuning, etc.).

As also illustrated in FIG. 5, query engine 558 extracts data from GILD 506 based at least in part on user selection of autonomy level(s), search tags required by the user, use case filter(s) based on criteria, candidate retrieval in a recommendation engine, etc. Further, one or more use case-based embeddings 557 and outputs from query engine 558 (e.g., data extracted from GILD 506) are used in generating an output of filtered results 559. In one or more embodiments, filtered results 559 include the best possible set of results for one or more user requests based at least in part on the user-selected level of autonomy and one or more user preferences.

Figure 6:
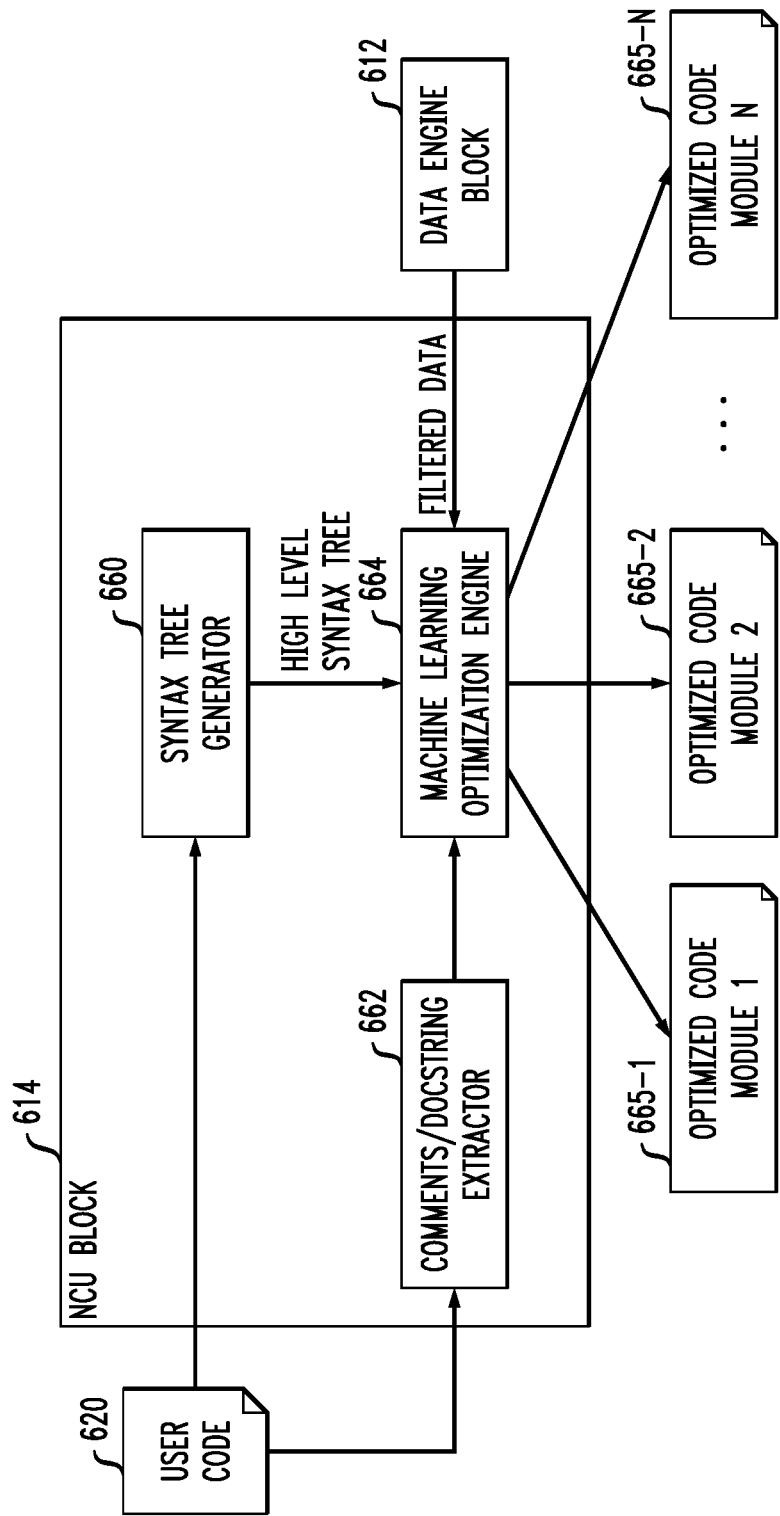
FIG. 6 shows an example natural code understanding (NCU) block in an illustrative embodiment.

FIG. 6 shows an example NCU block in an illustrative embodiment. By way of illustration, FIG. 6 depicts NCU block 614, which includes syntax tree generator 660, comments and docstring extractor 662, and machine learning optimization engine 664. More specifically, NCU block 614 helps to understand user code 620, extract functionality information therefrom, process data related thereto, and ultimately provide corresponding outputs as input to machine learning optimization engine 664, which serves as a code generator and creates various optimized code modules 665-1, 665-2, ... 665-N (collectively referred to herein as optimized code modules 665). In one or more embodiments, optimized code modules 665 can include improvements in model architecture code, throughput code, and/or other types of code, wherein such improvements can include replacement code portions and/or new additions to the existing code. In such an embodiment, optimized code modules 665 can be based at least in part on the level of autonomy selected by the user along with one or more requested user preferences.

As also depicted in FIG. 6, syntax tree generator 660 creates, and provides to machine learning optimization engine 664, at least one syntax tree based at least in part on user code 620, wherein the at least one syntax tree comprises an intermediate representation of the code and is utilized to understand the functionality of user code 620. Additionally, comments and docstring extractor 662 processes user code 620 and provides additional details associated with user code 620 to machine learning optimization engine 664 to facilitate understanding of the functionality of various modules in the user code 620.

In one or more embodiments, machine learning optimization engine 664 is a transformer-based encoder-decoder network which can be used, for example, in language-based models and/or code generators. In connection with machine learning optimization engine 664, model training can be carried out in multiple phases, wherein a first phase includes trained with publicly available data, and a subsequent phase includes fine-tuning the model by further training on curated custom experiments created by one or more experts. In at least one embodiment, when user code 620 is presented to NCU block 614, machine learning optimization engine 664 processes inputs from syntax tree generator 660 and comments and docstring extractor 662, as well as filtered training data from data engine block 612. The machine learning optimization engine 664 recognizes one or more patterns, classifies one or more modules based on functionality, and generates optimized code based at least in part on data from GILD and user selection of autonomy level(s) and tags. Optimized code modules 665 produced by the machine learning optimization engine 664 can include individual modules (e.g., trees) for functionality and/or multiple modules (e.g., forests) linked together and which solve at least one specific problem. Such code module creation decisions can be based at least in part on the level of autonomy chosen by the user and performance on curated custom data from GILD.

Referring again to FIG. 4, one or more embodiments include implementation of performance simulation environment 416. In such an embodiment, performance simulation environment 416 is where workload assessment is carried out. Such an assessment can include, for example, the expected throughput and/or time to accuracy performance and the expected quality of service rendered by the optimized modules. In at least one embodiment, performance simulation environment can include a fully functioning sandbox environment with all required hardware, computes and accelerators.

In connection with one or more optimized code modules (such as generated, for example, by machine learning optimization engine 664 of NCU block 614), time to run workload estimations can be carried out wherein a given proposed optimized code module is run with at least one user-provided dataset and assessed for a fixed number of steps. For example, if the workload has 1000 steps and expects to run for 50 epochs, the performance also known as throughput assessment is run for 100 steps. Because the throughput per step is expected to be uniformly distributed between the warmup and cooldown steps, at least one embodiment can include approximating that the performance will be the expected sum of all of the steps. Total steps can be computed, for example, from the number of epochs. Accordingly, by way of example, the time to run a given workload can be calculated as follows: (the number of steps not included in the warmup*the time per each step)+ (the number of steps included in the warmup and the cooldown*noise time per each step), wherein noise is the approximate variance in the time per each step involved in warmup and cooldown.

Additionally, convergence estimations involve a setup to measure how convergence occurs in a given workload. One or more embodiments include proposing that the number of steps to run is first approximated by assessing the behavior of the workload from the knowledge derived from GILD. For example, it can be assumed that some workloads have a uniform behavior, while others have non-uniform behavior, and this adaptation is factored into the steps calculation. Further, at least one embodiment includes continuously improving in connection with GILD data point growth. Accordingly, by way of example, the number of steps can be approximated as the previous record (if such a record exists in GILD)+/−adaptation behavior assessment+/−a dataset similarity score from the reference GILD. The similarity of a current dataset of the workload to a dataset in GILD can be assessed, for example, using cosine similarity.

There can be other workloads that behave differently regarding how the workload drops the error rate, and one or more embodiments include tracking such error rate drops in the GILD. Additionally, at least one embodiment can include estimating the number of steps based at least in part on such GILD metadata, represented using the example function as follows: f(adaptation behavior assessment, dataset similarity score), assuming this workload setup exists on GILD.

If there is no background on the workload, one or more embodiments can include estimating the number of steps and updating the GILD. However, the convergence assessment is derived based on the number of steps and the workload history from the GILD. In the event there is no history of the workload in GILD, such an embodiment includes estimating convergence by running the workload for a limited number of steps denoted as 1_steps, such that 1_steps<<steps_count. Such an embodiment includes facilitating further estimation of the convergence based on the model, depending on the error rate drop behavior as seen on 1_steps. Additionally or alternatively, at least one embodiment can include estimating convergence using linear and non-linear extrapolation techniques based at least in part on the model behavior.

Further, in one or more embodiments, once the estimated convergence is recorded and the true convergence is established (e.g., such data points are stored in the GILD), such data can be used to build a regression and classification model that learns from at least a portion of these datapoints. Such a model would predict the target error rate and the likelihood of convergence given the model behavior, dataset similarity, steps, and/or other metadata. The output from such a model can be sent, in one or more embodiments, to a recommendation block to create one or more recommendations.

Figure 7:
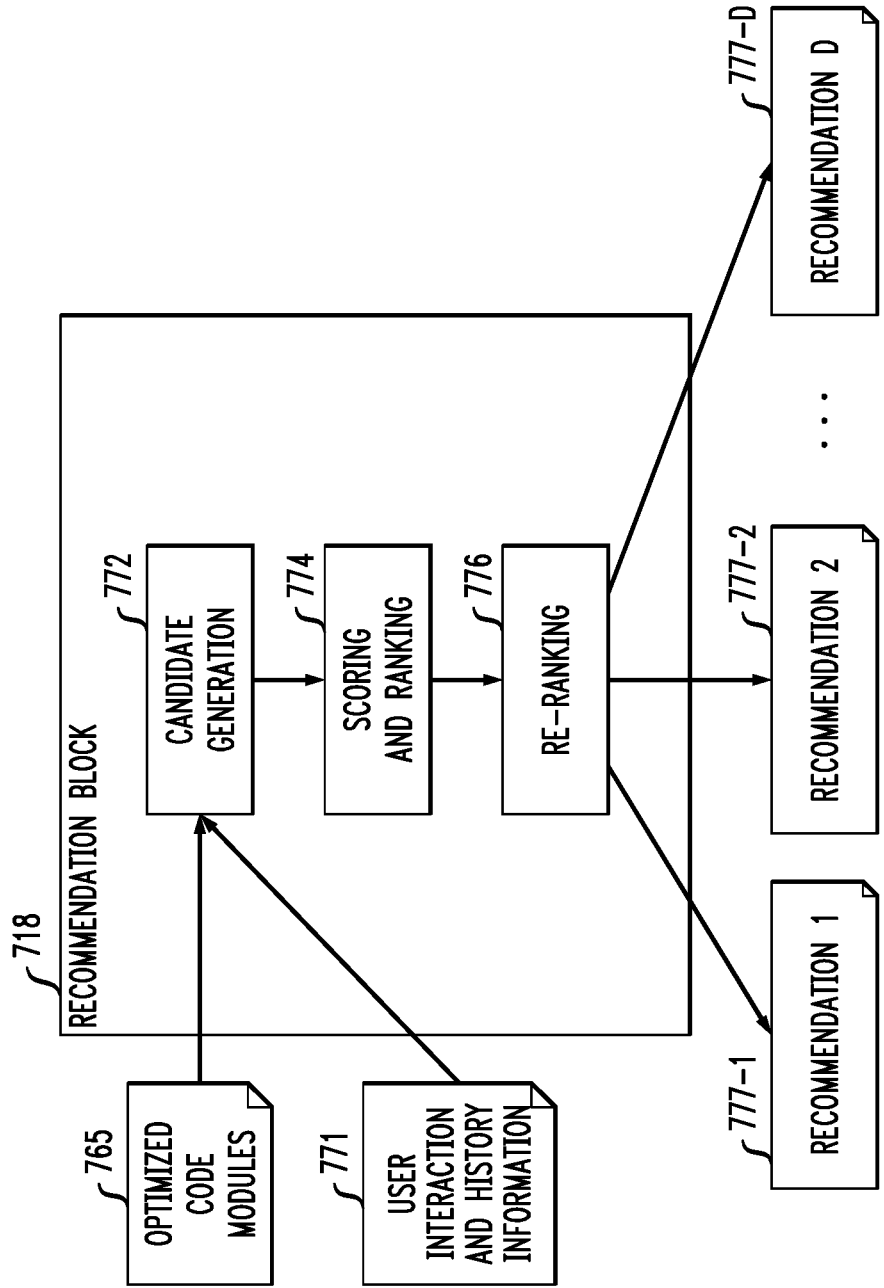
FIG. 7 shows example architecture of a recommendation block in an illustrative embodiment.

FIG. 7 shows example architecture of a recommendation block in an illustrative embodiment. As detailed herein, one or more embodiments include recommending code modules based at least in part on user preferences and one or more performance requirements. Accordingly, by way of illustration, FIG. 7 depicts recommendation block 718, which includes a candidate generation component 772, a scoring and ranking component 774, and a re-ranking component 776. Based on the optimized code modules 765 generated by a machine learning optimization engine (such as, for example, detailed in connection with FIG. 6) and validated by a simulation environment along with performance details, recommendation block 718 identifies one or more useful modules for the user and precludes and/or ignores elements which the user has specifically tagged as not required (e.g., based on user interaction and history information 771), ultimately outputting and/or displaying recommendations 777-1, 777-2, . . . , 777-D to the user. In one or more embodiments, artificial intelligence techniques such as, for example, at least one deep learning recommendation model can be used in connection with recommendation block 718 to create the recommendations.

As noted above and depicted in FIG. 7, recommendation block 718 includes various components. Specifically, candidate generation component 772 filters at least a portion of the optimized code modules 765 based at least in part on user preferences, and scoring and ranking component 774 scores and ranks each candidate generated by candidate generation component 772. In one or more embodiments, the candidates are scored based at least in part on one or more user expectations and one or more possible candidates in the set of results. Further, re-ranking component 776 re-ranks at least a portion of the candidates based at least in part on the user's previous interactions (e.g., some recommendation was rejected, the user wants some recommendations to be excluded, etc.). Also, re-ranking component 776 can re-rank at least a portion of the candidates based at least in part on information pertaining to which modules are most popular recently among other data scientists working on similar use cases.

It is to be appreciated that some embodiments described herein utilize one or more artificial intelligence models. It is to be appreciated that the term "model," as used herein, is intended to be broadly construed and may comprise, for example, a set of executable instructions for generating computer-implemented recommendations. For example, one or more of the models described herein may be trained to generate recommendations based on code functionality information, execution environment information and/or user-provided information, and such recommendations can be used to initiate one or more automated actions (e.g., generating scripts corresponding to one or more optimized code segments, automatically training artificial intelligence techniques, etc.).

Figure 8:
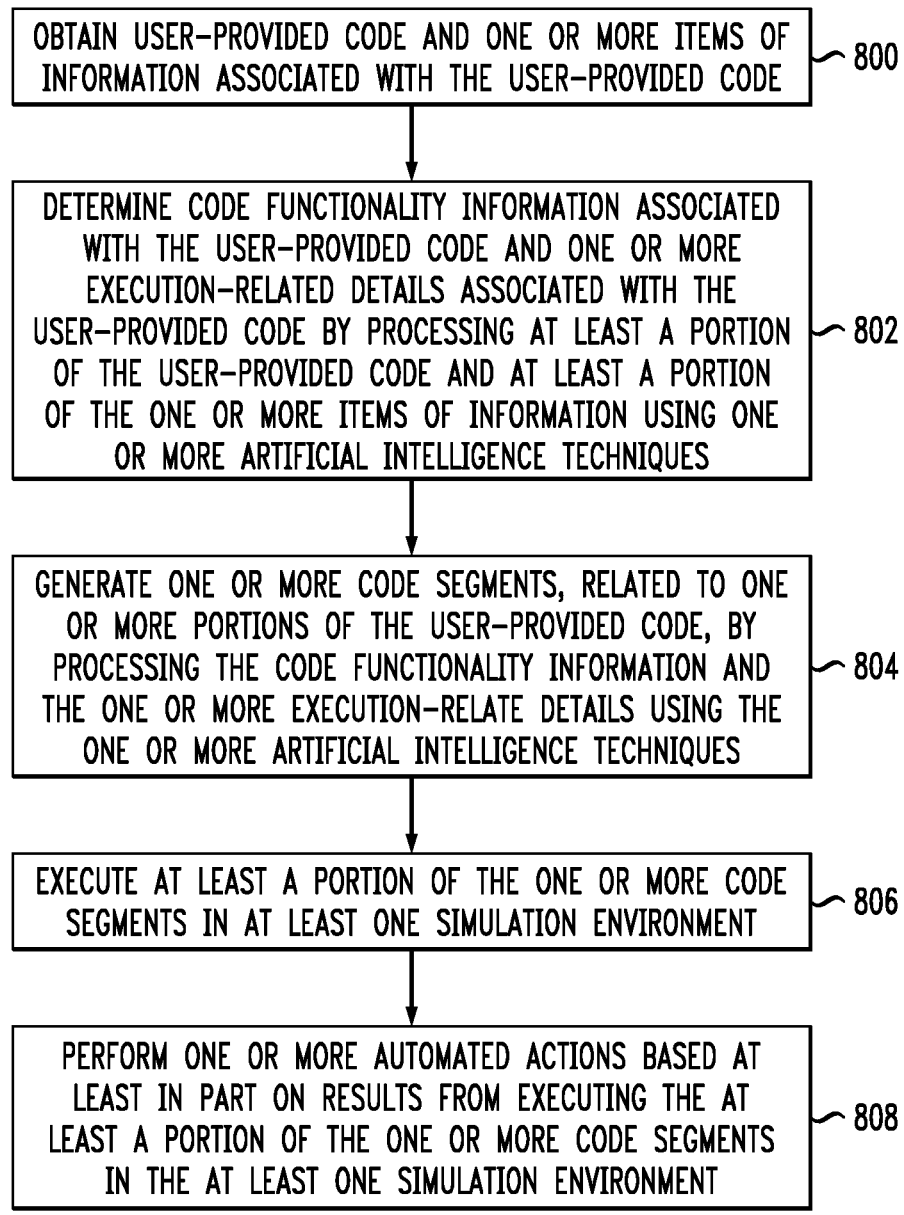
FIG. 8 is a flow diagram of a process for automatically modifying user code using artificial intelligence techniques in an illustrative embodiment.

FIG. 8 is a flow diagram of a process for automatically modifying user code using artificial intelligence techniques in an illustrative embodiment. It is to be understood that this particular process is only an example, and additional or alternative processes can be carried out in other embodiments.

In this embodiment, the process includes steps 800 through 808. These steps are assumed to be performed by automated user code modification system 105 utilizing elements 112, 114, 116 and 118.

Step 800 includes obtaining user-provided code (e.g., code associated with one or more artificial intelligence-based workloads) and one or more items of information associated with the user-provided code. In at least one embodiment, obtaining one or more items of information associated with the user-provided code includes obtaining a user-selected level of autonomy associated with the user-provided code. Also, obtaining one or more items of information associated with the user-provided code can include obtaining at least one of one or more environment details related to the user-provided code and information pertaining to one or more compute resources associated with the user-provided code. Additionally or alternatively, obtaining one or more items of information associated with the user-provided code can include obtaining one or more user-provided tags, related to one or more user requirements, attributed to at least one or more portions of the user-provided code.

Step 802 includes determining code functionality information associated with the user-provided code and one or more execution-related details associated with the user-provided code by processing at least a portion of the user-provided code and at least a portion of the one or more items of information using one or more artificial intelligence techniques. In one or more embodiments, determining code functionality information associated with the user-provided code and one or more execution-related details associated with the user-provided code includes processing at least a portion of the user-provided code and at least a portion of the one or more items of information using at least one encoder-decoder network.

Step 804 includes generating one or more code segments, related to one or more portions of the user-provided code, by processing the code functionality information and the one or more execution-related details using the one or more artificial intelligence techniques. In at least one embodiment, generating one or more code segments includes processing the code functionality information and the one or more execution-related details using at least one encoder-decoder network.

Step 806 includes executing at least a portion of the one or more code segments in at least one simulation environment. In one or more embodiments, executing at least a portion of the one or more code segments in at least one simulation environment includes determining one or more quality of service metrics associated with the one or more code segments. Additionally or alternatively, executing at least a portion of the one or more code segments in at least one simulation environment can include determining time to workload completion information associated with the one or more code segments.

Step 808 includes performing one or more automated actions based at least in part on results from executing the at least a portion of the one or more code segments in the at least one simulation environment. In at least one embodiment, performing one or more automated actions includes recommending, to the user, at least one of the one or more code segments based at least in part on the results from executing the at least a portion of the one or more code segments in the at least one simulation environment. In such an embodiment, recommending at least one of the one or more code segments can include outputting one or more performance details corresponding to the at least one code segment in conjunction with identifying the at least one code segment being recommended to the user. Also, performing one or more automated actions can include generating and outputting, to the user, at least one script corresponding to the at least one code segment being recommended. Additionally or alternatively, performing one or more automated actions can include automatically training the one or more artificial intelligence techniques using feedback provided by the user in connection with the at least one recommended code segment.

Accordingly, the particular processing operations and other functionality described in conjunction with the flow diagram of FIG. 8 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically modify user code using artificial intelligence techniques. These and other embodiments can effectively overcome problems associated with errors and/or low-quality, resource-intensive code deployments.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. Although described in the context of system 100, these platforms may also be used to implement at least portions of other information processing systems in other embodiments.

Figure 9:
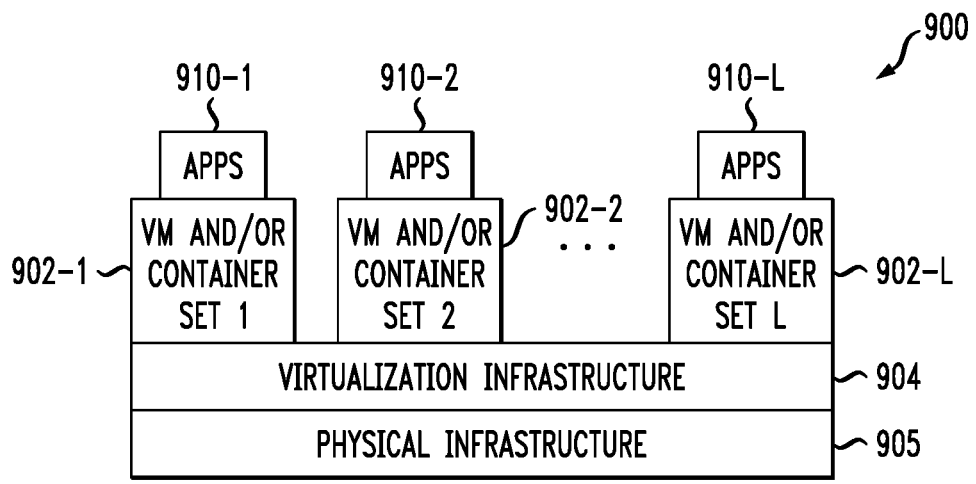
FIGS. 9 and 10 show examples of processing platforms that may be utilized to implement at least a portion of an information processing system in illustrative embodiments.
Figure 10:
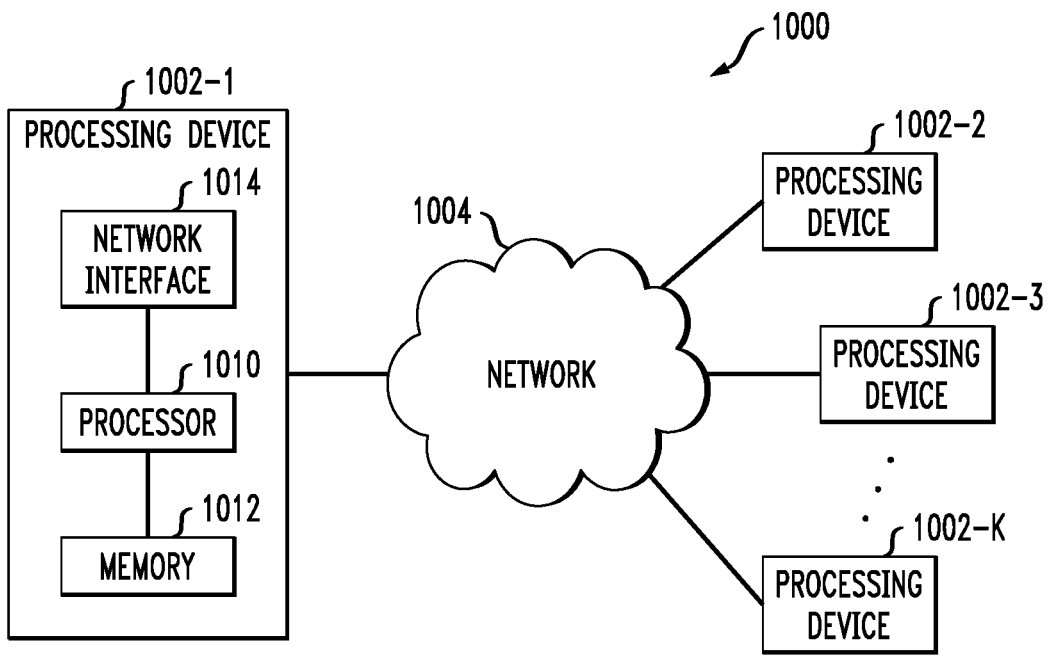

FIG. 9 shows an example processing platform comprising cloud infrastructure 900. The cloud infrastructure 900 comprises a combination of physical and virtual processing resources that are utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 comprise respective VMs, respective sets of one or more containers, or respective sets of one or more containers running in VMs. In some implementations of the FIG. 9 embodiment, the VMs/container sets 902 comprise respective VMs implemented using virtualization infrastructure 904 that comprises at least one hypervisor.

A hypervisor platform may be used to implement a hypervisor within the virtualization infrastructure 904, wherein the hypervisor platform has an associated virtual infrastructure management system. The underlying physical machines comprise one or more information processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1002-1 in the processing platform 1000 comprises a processor 1010 coupled to a memory 1012.

The processor 1010 comprises a microprocessor, a CPU, a GPU, a TPU, a microcontroller, an ASIC, a FPGA or other type of processing circuitry, as well as portions or combinations of such circuitry elements.

The memory 1012 comprises random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
   obtaining user-provided code and one or more items of information associated with the user-provided code, the one or more items of information comprising (i) one or more environment details related to the user-provided code, (ii) information pertaining to one or more compute resources associated with the user-provided code, and (iii) one or more user-provided tags, related to one or more user requirements, attributed to the user-provided code;
   determining code functionality information associated with the user-provided code and one or more execution-related details associated with the user-provided code by processing at least a portion of the user-provided code and at least a portion of the one or more items of information using one or more artificial intelligence techniques;
   generating one or more code segments, related to the at least a portion of the user-provided code, by processing the code functionality information and the one or more execution-related details using the one or more artificial intelligence techniques;
   executing at least a portion of the one or more code segments in at least one simulation environment; and
   performing one or more automated actions based at least in part on results from executing the at least a portion of the one or more code segments in the at least one simulation environment, wherein performing one or more automated actions comprises automatically replacing at least part of the user-provided code with at least a corresponding part of the one or more code segments;
   wherein the method is performed by at least one processing device comprising a processor coupled to a memory.

2. The computer-implemented method of claim 1, wherein performing one or more automated actions comprises recommending, to the user, at least one of the one or more code segments based at least in part on the results from executing the at least a portion of the one or more code segments in the at least one simulation environment.

3. The computer-implemented method of claim 2, wherein recommending at least one of the one or more code segments comprises outputting one or more performance details corresponding to the at least one code segment in conjunction with identifying the at least one code segment being recommended to the user.

4. The computer-implemented method of claim 2, wherein performing one or more automated actions comprises generating and outputting, to the user, at least one script corresponding to the at least one code segment being recommended.

5. The computer-implemented method of claim 2, wherein performing one or more automated actions comprises automatically training the one or more artificial intelligence techniques using feedback provided by the user in connection with the at least one recommended code segment.

6. The computer-implemented method of claim 1, wherein obtaining one or more items of information associated with the user-provided code comprises obtaining a user-selected level of autonomy associated with the user-provided code.

7. The computer-implemented method of claim 1, wherein generating one or more code segments comprises processing the code functionality information and the one or more execution-related details using at least one encoder-decoder network.

8. The computer-implemented method of claim 1, wherein determining code functionality information associated with the user-provided code and one or more execution-related details associated with the user-provided code comprises processing the at least a portion of the user-provided code and the at least a portion of the one or more items of information using at least one encoder-decoder network.

9. The computer-implemented method of claim 1, wherein executing at least a portion of the one or more code segments in at least one simulation environment comprises determining one or more quality of service metrics associated with the one or more code segments.

10. The computer-implemented method of claim 1, wherein executing at least a portion of the one or more code segments in at least one simulation environment comprises determining time to workload completion information associated with the one or more code segments.

11. The computer-implemented method of claim 1, wherein the user-provided code comprises code associated with one or more artificial intelligence-based workloads.

12. A non-transitory processor-readable storage medium having stored therein program code of one or more software programs, wherein the program code when executed by at least one processing device causes the at least one processing device:
   to obtain user-provided code and one or more items of information associated with the user-provided code, the one or more items of information comprising (i) one or more environment details related to the user-provided code, (ii) information pertaining to one or more compute resources associated with the user-provided code, and (iii) one or more user-provided tags, related to one or more user requirements, attributed to the user-provided code;
   to determine code functionality information associated with the user-provided code and one or more execution-related details associated with the user-provided code by processing at least a portion of the user-provided code and at least a portion of the one or more items of information using one or more artificial intelligence techniques;

to generate one or more code segments, related to the at least a portion of the user-provided code, by processing the code functionality information and the one or more execution-related details using the one or more artificial intelligence techniques;

to execute at least a portion of the one or more code segments in at least one simulation environment; and to perform one or more automated actions based at least in part on results from executing the at least a portion of the one or more code segments in the at least one simulation environment, wherein performing one or more automated actions comprises automatically replacing at least part of the user-provided code with at least a corresponding part of the one or more code segments.

13. The non-transitory processor-readable storage medium of claim 12, wherein performing one or more automated actions comprises recommending, to the user, at least one of the one or more code segments based at least in part on the results from executing the at least a portion of the one or more code segments in the at least one simulation environment.

14. The non-transitory processor-readable storage medium of claim 12, wherein obtaining one or more items of information associated with the user-provided code comprises obtaining a user-selected level of autonomy associated with the user-provided code.

15. The non-transitory processor-readable storage medium of claim 12, wherein generating one or more code segments comprises processing the code functionality information and the one or more execution-related details using at least one encoder-decoder network.

16. An apparatus comprising:
at least one processing device comprising a processor coupled to a memory;
the at least one processing device being configured:
to obtain user-provided code and one or more items of information associated with the user-provided code, the one or more items of information comprising (i) one or more environment details related to the user-provided code, (ii) information pertaining to one or more compute resources associated with the user-provided code, and (iii) one or more user-provided tags, related to one or more user requirements, attributed to the user-provided code;

to determine code functionality information associated with the user-provided code and one or more execution-related details associated with the user-provided code by processing at least a portion of the user-provided code and at least a portion of the one or more items of information using one or more artificial intelligence techniques;

to generate one or more code segments, related to the at least a portion of the user-provided code, by processing the code functionality information and the one or more execution-related details using the one or more artificial intelligence techniques;

to execute at least a portion of the one or more code segments in at least one simulation environment; and to perform one or more automated actions based at least in part on results from executing the at least a portion of the one or more code segments in the at least one simulation environment, wherein performing one or more automated actions comprises automatically replacing at least part of the user-provided code with at least a corresponding part of the one or more code segments.

17. The apparatus of claim 16, wherein performing one or more automated actions comprises recommending, to the user, at least one of the one or more code segments based at least in part on the results from executing the at least a portion of the one or more code segments in the at least one simulation environment.

18. The apparatus of claim 16, wherein obtaining one or more items of information associated with the user-provided code comprises obtaining a user-selected level of autonomy associated with the user-provided code.

19. The apparatus of claim 16, wherein generating one or more code segments comprises processing the code functionality information and the one or more execution-related details using at least one encoder-decoder network.

20. The apparatus of claim 16, wherein determining code functionality information associated with the user-provided code and one or more execution-related details associated with the user-provided code comprises processing the at least a portion of the user-provided code and the at least a portion of the one or more items of information using at least one encoder-decoder network.

* * * * *